United States Patent
Lin et al.

(10) Patent No.: US 8,504,104 B2
(45) Date of Patent: Aug. 6, 2013

(54) PORTABLE ELECTRONIC DEVICE, SERIAL TRANSMISSION INTERFACE OF PORTABLE ELECTRONIC DEVICE AND DATA TRANSMISSION METHOD THEREOF

(75) Inventors: Han Chang Lin, Hsin-Chu (TW); Chen Lung Liu, Hsin-Chu (TW); Kuei Kang Lee, Hsin-Chu (TW)

(73) Assignee: Pixart Imaging Inc., Hsin-chu County (TW)

(*) Notice: Subject to any disclaimer, the term of this patent is extended or adjusted under 35 U.S.C. 154(b) by 186 days.

(21) Appl. No.: 12/982,465

(22) Filed: Dec. 30, 2010

(65) Prior Publication Data
US 2011/0151927 A1  Jun. 23, 2011

Related U.S. Application Data

(63) Continuation-in-part of application No. 12/265,723, filed on Nov. 5, 2008.

(30) Foreign Application Priority Data

Jan. 4, 2010 (TW) ................................ 99100070 A
Mar. 2, 2010 (TW) ................................ 99105913 A

(51) Int. Cl.
*H04M 1/00* (2006.01)
(52) U.S. Cl.
USPC ..................... 455/557; 455/550.1; 345/418

(58) Field of Classification Search
USPC ................................. 455/550.1, 557; 345/418
See application file for complete search history.

(56) References Cited

U.S. PATENT DOCUMENTS

| 6,198,553 | B1* | 3/2001 | Yamamoto et al. | 358/520 |
| 6,728,312 | B1* | 4/2004 | Whitford et al. | 375/240.01 |
| 2005/0248657 | A1* | 11/2005 | Hsiao et al. | 348/207.1 |
| 2007/0013807 | A1* | 1/2007 | Kanai et al. | 348/362 |
| 2009/0315899 | A1* | 12/2009 | Pourbigharaz et al. | 345/501 |

FOREIGN PATENT DOCUMENTS
WO  2009152605  12/2009

* cited by examiner

*Primary Examiner* — Ajit Patel
(74) *Attorney, Agent, or Firm* — Lowe Hauptman Ham & Berner, LLP

(57) ABSTRACT

The present invention provides a serial transmission interface of a portable electronic device. The portable electronic device includes a control module, a display module and an image sensing module. The serial transmission interface includes a first line group coupled to between the control module and the image sensing module, and includes a second line group coupled to between the control module, the display module and the image sensing module; wherein when the control module sets the image sensing module to a master mode through the first line group, the image sensing module directly transmits captured image data to the display module through the second line group. The present invention further provides a portable electronic device and a data transmission method of the serial transmission interface of a portable electronic device.

19 Claims, 2 Drawing Sheets

PORTABLE ELECTRONIC DEVICE, SERIAL TRANSMISSION INTERFACE OF PORTABLE ELECTRONIC DEVICE AND DATA TRANSMISSION METHOD THEREOF

RELATED APPLICATIONS

This application is a continuation-in-part application of U.S. Ser. No. 12/265,723 filed on Nov. 5, 2008 and also claims the priority benefit of Taiwan Patent Application Serial Number 099100070 filed on Jan. 4, 2010 and Taiwan Patent Application Serial Number 099105913 filed on Mar. 2, 2010, the full disclosure of each of the above—listed prior applications is incorporated herein by reference.

BACKGROUND

1. Field of the Invention

This invention generally relates to a serial transmission system and, more particularly, to an image sensing module of a portable electronic device, a serial transmission interface between the control module and the display module of a portable electronic device and a data transmission method thereof.

2. Description of the Related Art

Presently, the image sensing module has been widely used in various portable electronic devices, such as a notebook and a cell phone. In conventional serial transmission systems, when a user is desired to preview real-time images acquired by an image sensing module on a display module, the image sensing module always transmits captured image data to a processing unit, e.g. a base band circuit or a CPU, for being pre-processed by such as image stacking, and then the processing unit transmits the image data to be previewed to the display module for display. Therefore, the processing unit needs to spend a lot of resources to provide preview service such that the processing unit may not be able to parallel process other events. For example, when the baseband circuit of a cell phone is executing the preview function before photographing, as the process of previewing images occupies most of the processing resources, the baseband circuit may not be able to deal with some messages or incoming calls.

Accordingly, it is necessary to provide a data transmission interface and a data transmission method that can reduce the process loading of the processing unit of a portable electronic device in an image preview mode so as to effectively avoid errors in real-time operation of the portable electronic device.

SUMMARY

The present invention provides a portable electronic device, a serial transmission interface of a portable electronic device and a data transmission method thereof that has two control modes for reducing the processing resources occupied in previewing images and further avoiding errors in real-time operation.

The present invention provides a serial transmission interface of a portable electronic device. The portable electronic device includes a control module, a display module and an image sensing module. The serial transmission interface includes a first line group coupled to between the control module and the image sensing module, and includes a second line group coupled to between the control module, the display module and the image sensing module; wherein when the control module sets the image sensing module to a master mode through the first line group, the image sensing module continuously and directly transmits, through the second line group, captured image data to the display module for displaying.

The present invention further provides a portable electronic device including an image sensing module, a display module, a control module and a serial transmission interface. The image sensing module is configured to capture images and to output a first image data and a second image data. The display module is configured to display the first image data. The control module is configured to control the image sensing module to output the first image data or the second image data, and to disable the display module to receive the second image data. The serial transmission interface includes a first line group and a second line group. The first line group is coupled to between the control module and the image sensing module. The second line group is coupled to between the control module, the display module and the image sensing module; wherein when the control module controls, through the first line group, the image sensing module to output the first image data, the first image data is directly transmitted to the display module through the second line group; when the control module controls, through the first line group, the image sensing module to output the second image data, the second image data is transmitted to the control module through the second line group and the control module disables the display module to receive the second image data.

The present invention further provides a data transmission method of a serial transmission interface of a portable electronic device. The portable electronic device includes a control module, a display module, an image sensing module, a first line group and a second line group. The data transmission method includes the steps of: setting the image sensing module with the control module to a master mode through the first line group; and directly transmitting a first image data from the image sensing module to the display module through the second line group.

In another aspect, the data transmission method of the present invention further includes the steps of: transmitting a reset control signal from the control module to the display module through the second line group to reset a pointer position of the display module; and transmitting a synchronization signal from the image sensing module to the control module through the first line group to have the control module transmit the reset control signal to the display module after the image sensing module acquires every image frame.

In another aspect, the data transmission method of the present invention further includes the steps of: setting the image sensing module with the control module to a slave mode through the first line group.

In another aspect, the slave mode of the data transmission method of the present invention further includes the steps of: transmitting a disable signal from the control module to the display module through the second line group to disable the display module to receive a second image data; informing, through the first line group, the image sensing module with the control module to output the second image data; and transmitting the second image data from the image sensing module to the control module through the second line group.

In the embodiments of the present invention, the first image data may be RGB image data (e.g. 2-bytes code) while the second image data may be YUV image data (e.g. 1-byte code).

The serial transmission interface of the present invention and data transmission method thereof may have a portable electronic device directly provide image data to the display module from the image sensing module during image preview so as to decrease the process loading of corresponding control unit, such as a baseband circuit or a controller.

The serial transmission interface of the present invention and data transmission method thereof may have a portable electronic device control the image sensing module to operate in a master mode or a slave mode according to operating status. In the master mode, the image sensing module directly transmits captured image data to the display module for real-time display. In the slave mode, the image sensing module transmits captured image data to the control module for storage or other post-processing.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

It should be noticed that, wherever possible, the same reference numbers will be used throughout the drawings to refer to the same or like parts.

The present invention relates to a serial transmission system and, more particularly, to a serial transmission interface and a data transmission method thereof applicable between the image sensing module, the control module and the display module of a portable electronic device. The portable electronic device is an electronic device with camera function.

Figure 1:
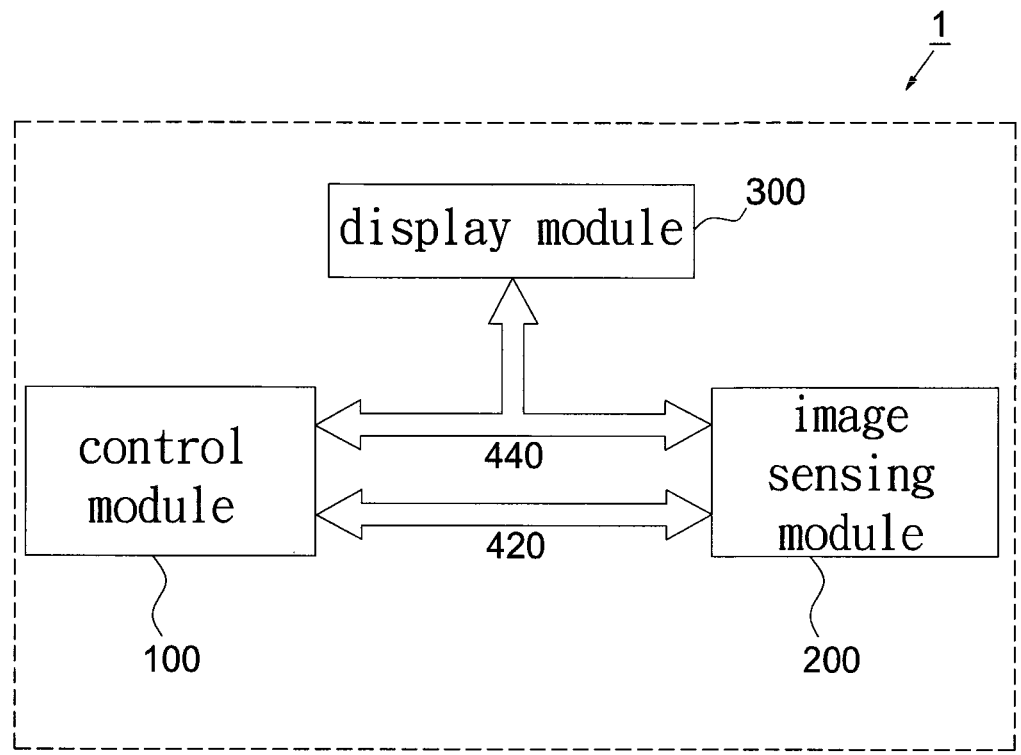
FIG. 1 shows a block diagram of the serial transmission system of a portable electronic device according to an embodiment of the present invention.

Please refer to FIG. 1, it shows a block diagram of the serial transmission system of a portable electronic device 1 according to an embodiment of the present invention. The portable electronic device 1 may be, for example, a notebook, a cell phone or a personal digital assistance, but the present invention is not limited to these. The portable electronic device 1 includes a control module 100, an image sensing module 200, a display module 300 and a serial transmission interface, which includes a first line group 420 and a second line group 440. The image sensing module 200 includes, for example a CCD image sensor or a CMOS image sensor configured to acquire images and to output a first image data and a second image data. The display module 300 includes, for example a liquid crystal display or the like to real-time display the image data acquired by the image sensing module 200. It is appreciated that, the portable electronic device 1 further includes other components not shown in FIG. 1.

If the portable electronic device 1 is a notebook, the control module 100 may be a CPU. If the portable electronic device 1 is a cell phone, the control module 100 may be a baseband circuit. In addition, the present invention is also applicable to other electronic devices with camera function.

The serial transmission interface is configured to provide the transmission of control signals, clock signals and image data between the control module 100, the image sensing module 200 and the display module 300. The first line group 420 is coupled to between the control module 100 and the image sensing module 200 to have the control module 100 provide control signals to the image sensing module 200 through the first line group 420, and have the image sensing module 200 provide frame synchronization signals to the control module 100 through the first line group 420. The second line group 440 is coupled to between the control module 100, the image sensing module 200 and the display module 300 configured to provide the transmission of image data between the image sensing module 200 and the display module 300, and the transmission of control signals between the control module 100 and the display module 300.

The serial transmission interface may be a serial peripheral interface (SPI) or a universal asynchronous receiver/transmitter (UART), or may be implemented by a universal serial bus (USB) or a mobile industry processor interface (MIPI). In addition, the first line group 420 may be implemented by an Inter-IC bus ($I^2C$).

The image sensing module 200 is configured to successively acquire image frames so as to provide a user photographing function. Before taking a photo, the image sensing module 200 may also provide real-time image preview through the display module 300, such that the user can determine the photographing time, direction or position according to the previewed images.

It is appreciated that, the aforementioned image preview mode may be an operation mode that the system directly enters while turning on, or an operation mode enabled by pushing a particular button on the portable electronic device by the user.

Figure 2:
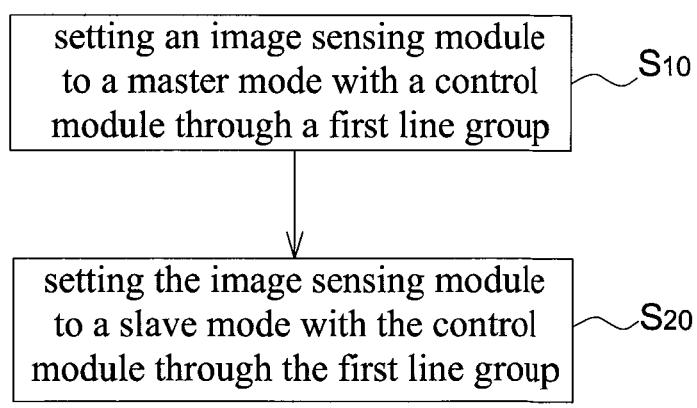
FIG. 2 shows a flow chart of the data transmission method of the serial transmission interface of a portable electronic device according to an embodiment of the present invention.

Please refer to FIG. 2, it shows a flow chart of the data transmission method of the serial transmission interface of a portable electronic device according to an embodiment of the present invention. The serial transmission system of the present invention has a master mode and a slave mode. The data transmission method of the serial transmission interface includes the steps of: setting the image sensing module 200 with the control module 100 to a master mode through the first line group 420 (Step $S_{10}$); and setting the image sensing module 200 with the control module 100 to a slave mode through the first line group 420 (Step $S_{20}$). In an embodiment, the master mode may be an image preview mode while the slave mode may be a photographing mode.

Figure 3:
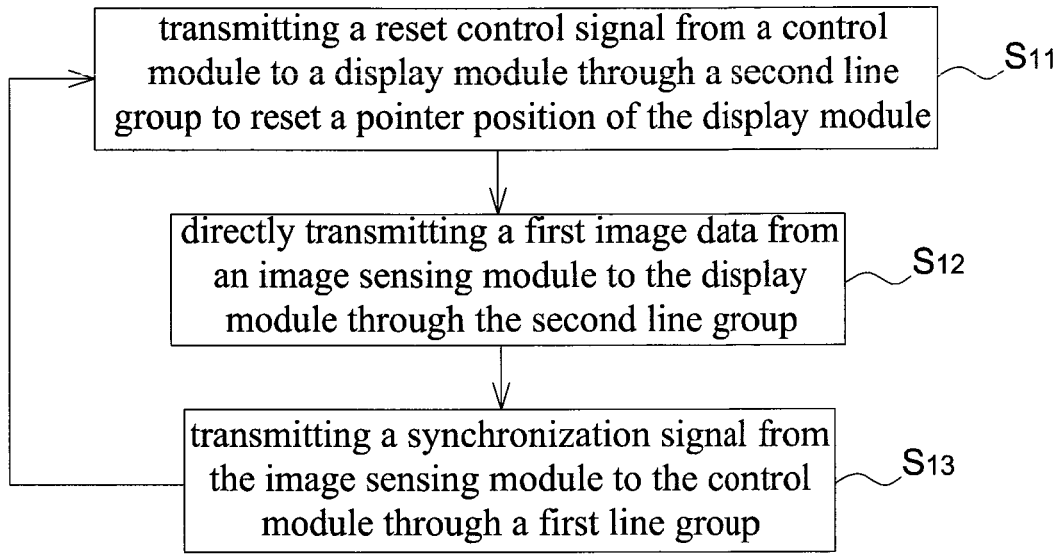
FIG. 3 shows a flow chart of the master mode operation of the serial transmission interface of a portable electronic device according to an embodiment of the present invention.

Please refer to FIG. 3, it shows a flow chart of the master mode operation of the serial transmission interface of the portable electronic device according to an embodiment of the present invention including the steps of: transmitting a reset control signal from the control module 100 to the display module 300 through the second line group 440 to reset a pointer position of the display module 300 (Step $S_{11}$); directly transmitting a first image data from the image sensing module 200 to the display module 300 through the second line group 440 (Step $S_{12}$); and transmitting a synchronization signal from the image sensing module 200 to the control module 100 through the first line group 420 (Step $S_{13}$).

While executing image preview mode, the control module 100 may set the image sensing module 200 to the master mode through the first line group 420 (Step $S_{10}$). At this moment, the control module 100 first transmits a reset control signal to the display module 300 through the second line group 440 so as to reset a pointer position of the display module 300 to a predetermined position, e.g. a coordinate (0,0) or (1,1) (Step $S_{11}$). In this manner, the display module 300 is able to display real-time image data transmitted from the image sensing module 200 normally. In master mode, the image sensing module 200 may actively and directly transmit, through the second line group 440, acquired first image data to the display module 300 for display without being previously processed by the control module 100 (Step $S_{12}$); wherein the first image data may be RGB image data. Accordingly, the occupied processing resources of the control module 100 can be effectively reduced by entering the master mode.

In the master mode, in addition to actively and directly transmitting acquired image data to the display module 300 for real-time image preview, the image sensing module 200 also transmits a frame synchronization signal to the control module 100 through the first line group 420 after acquiring every image frame (Step $S_{13}$). In this manner, after the image sensing module 200 every time transmits the image data of one image frame to the display module 300, the control module 100 refreshes the pointer position of the display module 300 to the predetermined position, such that the display module 300 is able to display the next image frame transmitted from the image sensing module 200 normally.

Figure 4:
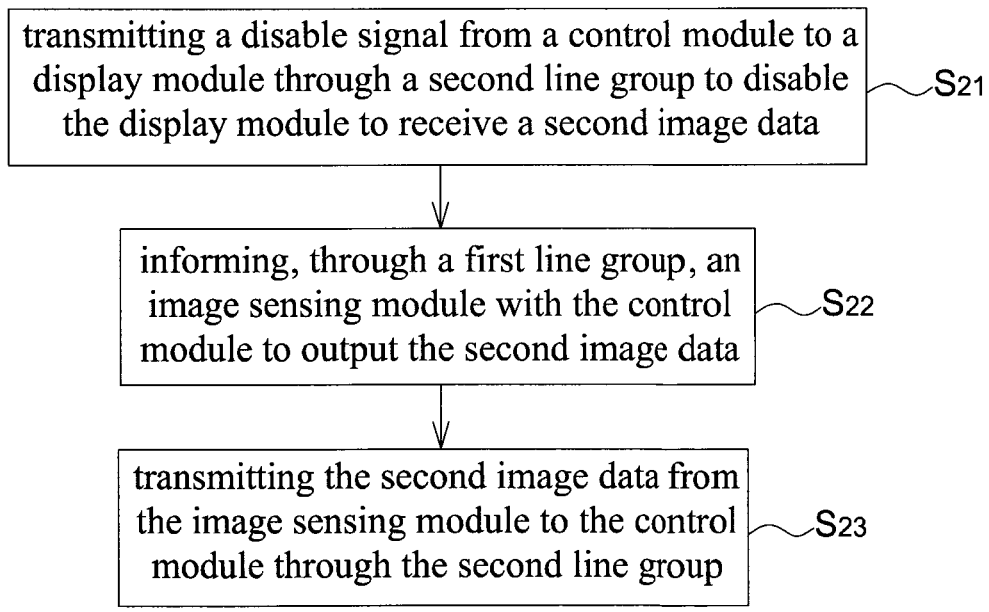
FIG. 4 shows a flow chart of the slave mode operation of the serial transmission interface of a portable electronic device according to an embodiment of the present invention.

Please refer to FIG. 4, it shows a flow chart of the slave mode operation of the serial transmission interface of a portable electronic device according to an embodiment of the present invention including the steps of: transmitting a disable signal from the control module 100 to the display module 300 through the second line group 440 to disable the display module 300 to receive a second image data (Step $S_{21}$); informing, through the first line group 420, the image sensing module 200 with the control module 100 to output the second image data (Step $S_{22}$); and transmitting the second image data from the image sensing module 200 to the control module 100 through the second line group 440 (Step $S_{23}$).

In order to execute the photographing operation, the control module 100 may set the image sensing module 200 to a slave mode through the first line group 420. For example, the control module 100 transmits an image acquiring signal to the image sensing module 200 through the first line group 420 according to an operation, e.g. pressing the shutter, performed by a user to have the image sensing module 200 output a second image data (Step $S_{20}$). In the slave mode, to prevent error display of the display module 300 from receiving the second image data, the control module 100 transmits a disable signal to the display module 300 to disable the display module 300 to receive the second image data (Step $S_{21}$), e.g. controlling an input resistance of the display module 300 to change to a high resistance to stop the input of the second image data. In an embodiment, after the display module 300 receives the disable signal, the display module 300 may repeatedly display an image frame of the first image data before receiving the disable signal. When the control module 100 sets the image sensing module 200 to enter the slave mode, the control module 100 is possibly processing other messages or data thereby being unable to deal with the second image data immediately. The image sensing module 200 will not transmit the second image data until receiving a notification from the control module 100, and the image sensing module 200 does not output any image data during waiting the notification. When the control module 100 is able to process the second image data, the control module 100 informs the image sensing module 200 to output the second image data through the first line group 420 (Step $S_{22}$). Next, the image sensing module 200 transmits the second image data through the second line group 440 to the control module 100 for storage or for other post-processing (Step $S_{23}$).

In a word, in the master mode (e.g. image preview), the image sensing module 200 may directly provide the image data in RGB format to the display module 300 through the second line group 440 for being displayed by the display module 300, wherein the RGB image data may be 2-bytes code (i.e. 16-bits words). In the slave mode (e.g. photographing), the image sensing module 200 may provide the image data in YUV format to the control module 100 through the second line group 440 for being, for example, compressed or stored by the control module 100, wherein the YUV image data may be 1-byte code (i.e. 8-bits words).

As mentioned above, in the serial transmission system of conventional portable electronic devices, image data acquired by the image sensing module are always previously transmitted to a processing unit for being processed to occupy the processing resources of the processing unit. The present invention further provides a portable electronic device (FIG. 1) and a serial transmission interface and data transmission method thereof (FIGS. 2-4) that may select to enter a master mode such that the image data acquired by the image sensing module are directly transmitted to the display module without being previously processed by the control module thereby reducing the operation loading of the control module and further eliminating the occurrence of error operation.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A serial transmission interface of a portable electronic device, which comprises a control module, a display module, and an image sensing module, the serial transmission interface comprising:
   a first line group coupled to the control module and the image sensing module; and
   a second line group coupled to the control module, the display module, and the image sensing module,
   wherein when the control module sets the image sensing module to a preview mode through the first line group, the image sensing module is configured to directly transmit captured image data to the display module through the second line group for real-time image preview.

2. The serial transmission interface as claimed in claim 1, wherein the serial transmission interface includes a serial peripheral interface or a universal asynchronous receiver/transmitter.

3. The serial transmission interface as claimed in claim 1, wherein the first line group includes an Inter-IC bus.

4. The serial transmission interface as claimed in claim 1, wherein the image sensing module is configured to transmit RGB image data to the display module.

5. The serial transmission interface as claimed in claim 1, wherein when the control module sets the image sensing module to a photographing mode through the first line group, the image sensing module is configured to transmit the captured image data to the control module through the second line group under control of the control module.

6. The serial transmission interface as claimed in claim 5, wherein the image sensing module is configured to transmit YUV image data to the control module.

7. A portable electronic device, comprising:
   an image sensing module configured to capture images and to output first image data and second image data;
   a display module configured to display the first image data;
   a control module configured to control the image sensing module to output the first image data or the second image data, and to disable the display module from receiving the second image data; and a serial transmission interface, comprising:
  a first line group coupled to the control module and the image sensing module; and
  a second line group coupled to the control module, the display module, and the image sensing module, wherein
when the control module controls, through the first line group, the image sensing module to output the first image data in a preview mode, the image sensing module is configured to transmit the first image data directly to the display module through the second line group for real-time image preview, and
when the control module controls, through the first line group, the image sensing module to output the second image data, the image sensing module is configured to transmit the second image data to the control module through the second line group and the control module is configured to disable the display module from receiving the second image data.

8. The portable electronic device as claimed in claim 7, wherein
  the portable electronic device includes a notebook computer, and
  the control module includes a CPU of the notebook computer.

9. The portable electronic device as claimed in claim 7, wherein
  the portable electronic device includes a cell phone, and
  the control module includes a baseband circuit of the cell phone.

10. The portable electronic device as claimed in claim 7, wherein
  the first image data includes RGB image data, and
  the second image data includes YUV image data.

11. The portable electronic device as claimed in claim 7, wherein the first line group includes an Inter-IC bus.

12. The portable electronic device as claimed in claim 7, wherein the serial transmission interface includes a serial peripheral interface or a universal asynchronous receiver/transmitter.

13. A data transmission method via a serial transmission interface of a portable electronic device, the serial transmission interface comprising a first line group and a second line group, the portable electronic device further comprising a control module, a display module and an image sensing module, the data transmission method comprising:
  setting the image sensing module with the control module to a preview mode through the first line group; and
  directly transmitting first image data from the image sensing module to the display module through the second line group for real-time image preview.

14. The data transmission method as claimed in claim 13, further comprising:
  transmitting a reset control signal from the control module to the display module through the second line group to reset a pointer position of the display module; and
  transmitting a synchronization signal from the image sensing module to the control module through the first line group.

15. The data transmission method as claimed in claim 13, wherein the first image data includes RGB image data.

16. The data transmission method as claimed in claim 13, further comprising:
  setting the image sensing module with the control module to a photographing mode through the first line group.

17. The data transmission method as claimed in claim 16, further comprising:
  transmitting a disable signal from the control module to the display module through the second line group to disable the display module from receiving second image data;
  instructing, through the first line group, the image sensing module with the control module to output the second image data; and
  transmitting the second image data from the image sensing module to the control module through the second line group.

18. The data transmission method as claimed in claim 17, wherein the second image data includes YUV image data.

19. The data transmission method as claimed in claim 17, wherein the first image data and the second image data represent the same image captured by the image sensing module.

* * * * *